US006406585B1

(12) United States Patent
Taubert

(10) Patent No.: US 6,406,585 B1
(45) Date of Patent: Jun. 18, 2002

(54) METHOD FOR THE APPLICATION OF A DECORATIVE LAYER ON A SUBSTRATE

(76) Inventor: Wilhelm Taubert, Oppenkampstrasse 5, D-47167 Duisberg (DE)

( * ) Notice: Subject to any disclaimer, the term of this patent is extended or adjusted under 35 U.S.C. 154(b) by 0 days.

(21) Appl. No.: 09/231,876

(22) Filed: Feb. 16, 1999

Related U.S. Application Data

(63) Continuation-in-part of application No. 08/903,384, filed on Jul. 30, 1997, now abandoned, which is a continuation of application No. 08/458,845, filed on Jun. 2, 1995, now abandoned, which is a continuation of application No. 08/075,802, filed on Jun. 14, 1993, now abandoned.

(30) Foreign Application Priority Data

Jun. 13, 1992 (DE) .......................................... 42 19 446

(51) Int. Cl.[7] ................................................ B32B 31/00

(52) U.S. Cl. .................... 156/275.5; 156/242; 156/245; 156/247; 156/275.7; 156/289

(58) Field of Search ................................ 156/242, 245, 156/247, 275.5, 275.7, 64, 324, 289; 264/496

(56) References Cited

U.S. PATENT DOCUMENTS

| | | | | |
|---|---|---|---|---|
| 4,413,019 A | * | 11/1983 | Brenner | 156/275.5 |
| 4,789,604 A | | 12/1988 | Van der Hoeven | |
| 4,844,764 A | | 7/1989 | Nablo et al. | |

FOREIGN PATENT DOCUMENTS

| | | |
|---|---|---|
| DE | 28 12083 | 7/1979 |

* cited by examiner

*Primary Examiner*—Jeff H. Aftergut
(74) *Attorney, Agent, or Firm*—Collard & Roe, P.C.

(57) ABSTRACT

In a system for the application of a decorative layer made of a beam-curable coating mass, in particular out of lacquer, glue, adhesive or a mixture of some or all thereof (lacquer and glue, lacquer and adhesive, glue and adhesive, or lacquer, glue and adhesive), on a carrier-plate and/or a web-formed substrate, where the decorative-layer will be treated so long with high-energy radiation particularly UV-radiation, x-ray-radiation, laser-radiation and/or electron radiation, under the maintenance of a certain temperature at normal pressure, so that it will be crosslinked and/or polymerized until the decorative-layer has reached a desired hardness, it is provided, that the decorative layer, which has to be cured, as a shield against the influence of oxygen on one side, it will be covered by the from the substrate formed carrier-plate and on the other side, it will be covered by a foil, for example by a carrier foil, that the radiation of the decorative layer with high-energy, take place in an inert gas-free atmosphere and that a pressure in the heights of atmospheric pressure will be tuned and that during the effective time of the high-energy radiation, this pressure will be maintained.

2 Claims, No Drawings

METHOD FOR THE APPLICATION OF A DECORATIVE LAYER ON A SUBSTRATE

CROSS-REFERENCE TO RELATED APPLICATIONS

This application is a continuation-in-part of application Ser. No. 08/903,384, filed Jul. 30, 1997, now abandoned which was a continuation of application Ser. No. 08/458,845, filed Jun. 2, 1995, now abandoned, which was a continuation of application Ser. No. 08/075,802, filed Jun. 14, 1993, now abandoned.

BACKGROUND OF THE INVENTION

1. Field of the Invention

The invention relates to a method for applying a decorative-layer made of an electron beam-curable coating mass, in particular a lacquer, a glue, an adhesive or a mixture of some or all thereof, on a backing plate and/or on a web-formed substrate, wherein the decorative-layer is sufficiently treated with high-energy radiation, particularly UV-radiation, x-ray-radiation, laser-radiation and/or electron radiation, at a certain temperature and normal pressure, such that it will be crosslinked and/or polymerized until the decorative-layer has reached a desired hardness.

2. The Prior Art

EP 0 166 153 B1 discloses a decorative plate which comprises a nuclear-coating, one- or two-sided decorative layers, as well as a limit layer, on at least one of the two plate surfaces. The limit layer is mainly made of a synthetic-resin, out of one or more, through radiation polymerized components, which are chosen from the group of unsaturated acrylates and methacrylates. This limit-layer, through radiation polymerized, is pressed under a pressure of 10 bar and at a minimum temperature of 80° C., so that this limit layer has a scratch-demand of about at least 2, preferably is scratch proof from 2 to 7 newton.

The components used have a strong inclination to polymerize radically during the influence of actinious radiation. As actinious radiation, near UV-light or high-energy radiation, e.g., electron-corpuscular-radiation or x-ray radiation, can be a possibility. When curing under the effect of actinious radiation, photoinitiators will be added which absorb the UV-light and which can facilitate, under the formation of radicals, the introduction of the radical polymerization. On the other hand, when curing with electron beam, photoinitiators are not necessary.

The electron beams which are used for the curing of the polymerizable compounds suitably have a corresponding energy of about 150 to 350 keV.

Actually, the application of coating masses occurs by rolling, casting or spraying on the plate-formed substrate. For web-formed materials among other things, multiple-roller-feeder, air jets, air knifes and the like are used.

The curing of the applied coating masses through high-energy radiation occurs under an inert gas atmosphere. The chemical affinity to oxygen of radicals formed by the influence of high-energy beams is higher than the affinity of the radicals among themselves. The consequence of this is that chain-breaking-reactions take place at the contact-surfaces between coating masses and air, which lead to useless surface-qualities on account of the defective molecule sizes.

In order to avoid these disadvantageous consequences, an inertization with nitrogen, carbon dioxide, exhaust of a stoichiometric combustion or a noble gas is employed. This inertization causes comparatively high running costs and consequently a very high technical effort on the part of the line-construction. In order to produce an acceptable surface-quality, this expensive construction in the past could not be avoided. Other systems, for example vacuum-inertization or curing under a thin water layer, turned out to be more expensive and less practicable. The matting, or rather the matting rank of the surface of the carrier foil, is reached by the input of additives. With it, the below limit of solvent free systems stays at a gloss rank of 45 at 60° according to Lange. A big share of matting-agents reduces the surface quality and leads to problems during the processing.

The development of a structured surface can only occur in narrow limits and partially in undesired forms, by applying the several application-systems, e.g., roll-structure with visible application direction. A change of the structure during the production-process is very costly and therefore commercially not realizable.

For the irradiation of a coating mass with high-energy radiation, a radiation chamber will be filled up with inert gas in a way that a residual oxygen content will be tuned, which normally lies between 10 to 1000 ppm oxygen. From this result surfaces which are sufficient for the actual demands.

The treatment in casing-, rolling- or spraying-machines requires a certain viscosity regarding the coating masses. This viscosity is reached by the addition of so-called "reactivity thinner." These mostly are low-molecular, one- or multiple unsaturated compounds, mainly acrylic-acid-residues, e.g., hexandiol-1.6-diacrylate. First of all, these monomers, as a result of their minor molecular weight and their marked chemical activity, are responsible for the negative trade-hygienical features of beam curable lacquers. These appear by inexpert treatment in form of skin- and mucous-membrane-irritation.

Today it is calculated that only 5% of the used lacquer quantity still remains on the plate as a solid after the application of the coating mass through spraying. With casting or rolling, a good exploitation of the inserted lacquer quantity will be reached, but a coating of profiled surfaces in fact isn't possible.

The prevailing used possibility, to give a structure to plate-formed materials, is the structuring of dividing-sheets, rolls or double-bands, which are utilized for the plate-production. This system is costly and moreover has the disadvantage that a small damage of the sensitive dividing-sheets, rolls or double-bands leads to the effect that the dividing-sheets, the rolls or the double-bands become useless and they have to be replaced by new dividing sheets, rolls or double bands.

In conventional coating-masses, for example in NC-lacquers, incident dust sinks and after the curing it isn't visible. By solvent-free systems the dust remains on the uncured coating mass and after the curing it is disturbing visible. With costly designed pure-chamber-lines with intake air super filtration, it was tried to shield the wet coating from the dust incidention. Mostly the results aren't satisfactory, this regards mainly the spray-application.

The necessary viscosity for the processing on conventional coatings can be adjusted by the addition of solvents. In beam curable systems, so-called "reactivity thinners" are used.

SUMMARY OF THE INVENTION

The object of this invention is to develop a method for the application of a decorative layer on a carrier-plate such that a decorative-plate can be cured without inert gas, whereby the substrate has a high scratch-resistance, a very good weather-resistance and wherein the plate can achieve any gloss-rank and any structure.

For achieving this object it is intended:

that in order to protect the decorative-layer, which has to be cured, against the influence of oxygen, on one side it will be covered by the substrate forming the carrier-plate, and on the other side it will be covered by a foil, for example, by a carrier-foil, that the irradiation of the decorative layer with high-energy radiation will be conducted in an inert gas-free atmosphere, and that a pressure adequate to the level of the atmospheric pressure will be tuned and during the influence time of the high-energy radiation it will be maintained.

In this way a system for the application and the structuring of a decorative layer on a carrier plate is obtained which doesn't have the above-mentioned disadvantages and which to the contrary is developed in a way that the plate with the applied coating mass can be cured without inert gas and which is characterized by a special high scratch-resistance and a very good weather-resistance. It is possible to give to the plate any gloss-rank and any structure.

In this system there exists no contact-surface between the coating mass and air, so that no radical chain-breaking reaction due to the effect of oxygen takes place. The coating mass, which has to be cured, and the out of this formed decorative layer on the one side will be covered by the substrate and on the other side it will be covered by the carrier foil and so it will be protected against the influence of oxygen.

The invention further concerns a method for the application of a decorative layer as a single-layer made of a beam curable coating mass, in particular out of lacquer, glue, adhesive or a mixture of some or all of these substances, on a carrier-plate, where the decorative layer will be treated so long with high-energy radiation, particularly UV-radiation, x-ray-radiation, laser-radiation, and/or electron radiation, at a certain temperature and normal pressure, so that it will be crosslinked and/or polymerized, until the decorative layer has reached a desired hardness.

It is intended:

that the front of a plastics sheet will be coated with a decorative layer made of a beam-curable coating mass, that the plastics-sheet with the coated front will be backed on the front of a carrier plate such that the decorative-layer will find itself between the front of the carrier-plate and the front of the plastics-sheet, that the decorative layer will be treated with high-energy radiation through the plastics-sheet, and thereby it will be cured, and that the carrier plate, including the plastics-sheet and the beam cured decorative layer, will be squared.

After the coating of the front of the carrier plate is terminated, the carrier-plate suitable will be turned and the back will be treated in the same manner as the front.

Advantageously, for the coating of the foil with the decorative-layer, a plastic is used.

According to a practical development of the invention it is intended that the carrier-plate, before it is laminated with the on the plastics-sheet coated decorative layer, is moistened by rolling, casting or the like, with a beam-curable coating mass, mainly made of lacquer, glue or a mixture of some or all thereof.

Further the invention relates to a method for the application of a decorative layer as a double-layer made of an electron beam curable coating mass, in particular out of lacquer, glue, adhesive or a mixture of some or all thereof, on a carrier plate, where the decorative layer will be treated so long with high-energy radiation, particularly UV-radiation, x-ray-radiation, laser-radiation and/or electron radiation, at a certain temperature and normal pressure, so that it will be crosslinked and/or polymerized, until the decorative layer has reached a desired hardness.

Here it is intended that the front of a first plastics sheet is coated with a first decorative-layer made of a beam curable coating mass, that the front of the first plastics sheet with the decorative-layer will be laminated on a carrier plate in a way that the decorative layer is placed between the front of the carrier-plate and the front of the first plastics sheet, that the first plastics sheet will be taken off from the almost cured first decorative layer, that the first front of a second plastics-sheet will be coated with a second decorative-layer made of a beam curable coating mass, that the front of the second plastics-sheet with the second decorative-layer will be laminated on a carrier-plate in the way that therefrom the following structure carrier plate
beam-cured-coating mass
beam-curable-coating mass
second plastics sheet
results, that the whole above-defined structure will be treated with high-energy radiation through the second plastics sheet, and that the carrier-plate, including the second plastics-sheet and the beam cured, first decorative layer and the second decorative layer, will be squared.

During this the carrier plate, after the front is completely coated, can be turned and the back can be treated in the same manner like the front was treated before.

Suitably, the from the treated layer skinned plastics-sheet, can be spooled up and it can be coated and pressurelessly laminated again.

The invention relates to a method for the application of a decorative layer, as a single-layer, made of an electron beam curable coating mass, in particular out of lacquer, glue, adhesive or a mixture of some or all thereof, on an endless-carrier-material, in particular a carrier-foil, where the decorative layer will be treated so long with high-energy radiation, particularly UV-radiation, x-ray-radiation, laser-radiation and/or electron radiation, at a certain temperature and normal pressure, so that it will be crosslinked and/or polymerized until the decorative layer has reached a desired hardness.

In this case the intention is:

that the front of a plastics-sheet will be coated with a decorative-layer made of a beam-curable coating mass, that the plastics-sheet with the coated front will be backed on an endless- carrier-material in a way that the decorative layer will be situated between the carrier material and the plastics sheet, that the decorative layer will be treated through the plastics-sheet with high-energy radiation, and that the carrier-material including the plastics-sheet with the beam cured decorative-layer will be spooled up.

Further, this invention relates to a method for the application of a decorative layer, as a double-layer, made of an electron beam curable coating mass, in particular out of lacquer, glue, adhesive or a mixture of some or all thereof, on an endless carrier material, in particular a carrier-foil where the decorative layer will be treated so long with high-energy radiation particularly UV-radiation, x-ray-radiation, laser-radiation and/or electron radiation, under the maintenance of a certain temperature at normal pressure, so that it will be crosslinked and/or polymerized, until the decorative layer has reached a desired hardness.

In this case the invention consists in the fact:

that the front of a first plastics-sheet will be coated with a first decorative-layer made of a beam-curable coating mass, that the front of a second plastics-sheet will be coated with a second decorative-layer made of a beam-curable coating mass, in particular out of a beam-curable adhesive substance, that each plastics-sheet coated with a decorative layer will be laminated together such that the decorative-layers, respectively the coated sides will lie in a pile and that they will be covered, on the outside, by the carrier-foil, that the decorative layers will be treated with high-energy radiation, and that the complete foil-parcel will be spooled up.

In practice, the finished foil parcel will be processed further, for example, it will be laminated on a carrier plate.

Further, this invention relates to a method for the application of a decorative layer, as a single-layer or a multiple-layer made of a beam-curable coating mass, in particular out of lacquer, glue, adhesive or a mixture of some or all thereof, on shaped, board-formed carrier-materials, where the decorative layer will be treated so long with high-energy radiation, particularly UV-radiation, x-ray-radiation, laser-radiation and/or electron radiation, under the maintenance of a certain temperature at normal pressure, so that it will be crosslinked and/or polymerized, until the decorative layer has reached a desired hardness.

In this case the invention intends:

that the front of a plastics-sheet will be coated with a decorative layer made of a beam-curable coating mass, that the coated plastics-sheet will be laminated on a shaped, board-formed carrier-material, by pressing it on with low pressure, that the decorative layer will be treated with high-energy radiation.

Here it is recommended that a second, third or further decorative layers of different or same kinds, for example by the utilization of the screen-printing-system, similar to inlays, will be applied.

Finally, this invention relates to a method for the production of a pre-produced lacquer-carrier-laminate.

Here it is provided that a plastics-sheet will be coated with a decorative-layer mad e of a beam-curable coating mass and that the coated plastics-sheet will be backed on a carrier laminate. The carrier laminate, for this utilization, consists out off the most different materials.

It is advantageous to supply the carrier-material with an electron beam-curable adhesive.

In the further development of the invention it can be provided:

that the layer, made of electron beam curable adhesive will be cured together and simultaneous with the decorative layer, made of one coating mass, that the adhesive and the coating mass will be treated with high-energy radiation, that a silicone separating-paper will be approached, and that the whole lacquer-carrier-parcel will be spooled up.

Suitably, the carrier-foil, together with the decorative layer, remains on the carrier plate.

Matt or high-gloss surfaces will be induced by the defined development of the carrier-foil. The carrier-foil, with simple methods, can be produced in matt or in high-gloss, respectively a disponible carrier-foil with additional treatment can receive a matt or a high-gloss surface. In this case, additives, which could reduce the surface quality, are not necessary. The development of the surface is already, exactly possible by the foil itself.

Through the lacquer application, on a before exactly structured foil, each surface-structure is available. The structure is independent of the application system. A change of the structure is possible by the exchange of the carrier foil, in very short and economical way.

By the complete covering of the lacquer surface with the carrier-foil, the residual oxygen concentration practically will be reduced on zero, which results in a noticeable improvement in the surface features and in particular of the scratch-resistance.

Through the complete covering of the lacquer surface against oxygen, the reaction-balance of the polymerization-reaction shifts itself on the side of the long-chain macro molecules.

In this developed system, it is possible to work with very good results by heat-controlled viscosities, for example with air jets. During this the monomer concentration of the coating mass will be extremely reduced. Therefrom are resulting better surface-features and a facilitized handling of the substances.

An inertization of the radiation-chamber isn't required for the coating result.

There is almost no material loss during the coating by spraying because the coating-material will be applied on the foil and the foil will be laminated. To add is, that by this inventional developed system results a reduction of the applicated thickness of layer and so a further saving of the material. If necessary in dependence to the substrate, it can be refrained from the utilization of a base coat.

In the production of an endless-foil, this one will be structured independently and with a great regularity. Errors in the production will be recognized prematurely, so that the faulty material can be eliminated. Thereby the costs are reduced to a minimum, eventual defects are immediately recognizable and so only the defective material must be regarded as exit wounds, without exiting in additional the good material.

The foil is a direct production-means and no servicing is necessary. After the coating- and curing-process, the carrier-foil serves as packing, respectively as a transport-protection of the carrier-plate or the carrier-foil. In addition this effects an appreciation and it reduces the costs.

The carrier-foil can be produced and sent in under dust free conditions. The dust free application of the coating mass can be realized very simply. The carrier foil covers the wet layer securely against the incident of dust, so that a dust free working by the foil-covering is possible.

By corresponding shaping of the carrier-foil, "thick" layers up to several centimeter thickness can be applied on the substrate.

For curing this layer, the energy-input must be chosen in correspondence. Low-energy electron accelerators with electron beams, with a corresponding energy of about 250 keV, can cure layers up to 308 $g/m^2$. There are electron accelerators with electron beams with an energy of about several MeV available, whereby appropriate thick layers can be cured.

The developed application methods allow an easy warming-up of the coating mass. Beam curable coating substances are solvent free, so that accordingly to that there doesn't appear any changes of viscosity by the solvent-evaporation. As well beam-curable coating masses are characterized, that they, via high-energy radiation are crosslinkable and/or polymerizable. The coating masses can be for example lacquer, glue or mixture-coatings.

As radiation sources, all known radiation sources can be used, e.g. UV-, x-ray-, laser- and/or electron beam sources.

The coating masses, should the occasion arise, have to be tuned and modified, regarding the for curing used radiation source. Fundamentally the coating substances can be solventfree.

All board-formed, three-dimensional and/or web-formed materials can be used, which can be refined, by electron beam curable coatings, for example:

fibre-boosted laminates, for instance glass fibre material, aramid, coal and the like, facade panels, for instance cement-fibre-slabs or the like, plaster chip slabs or plaster carton slabs, laminated slabs (HPL-boards), metalliferous laminates, metallic substrates, for instance aluminum, steel sheet or the like, namely either as web-formed or as plate-formed materials, mineral matter laminates siliconized foils and/or papers, chipboards and other gubatrates.

The carrier foils which are used for the application have to be coinable, they don't have to succumb to an embrittlement by high-energy radiation. Further on, a decomposition by high-energy radiation does not occur and also no chemical reactions have to run with the coating masses. Beyond it the foils have to have a defined adhesive behavior.

The fields of the, with the above mentioned systems, treated carrier-plates are for example:

coatings for food packing, office furnitures, coil-coatings facade slabs formed part coatings plaster carton slabs glass-resin-laminates backing adhesion, kitchen furnitures, plastic parts for the automobile industry, panel-coatings, parquets, plate like materials for the furniture industry and profiled furniture rivestments.

I claim:

1. A process for producing a foil pack having a decorative layer comprising coating a front side of a first plastic foil with a first decorative layer comprising a beam-hardenable coating material, coating a front side of a second plastic foil with a second decorative layer comprising a beam-hardenable coating material, laminating the plastic foils each coated with a decorative layer together in such a way that the decorative layers or the coated sides bear against each other and are covered relative to the exterior by the plastic foils, providing the first plastic foil with an electron beam-hardenable adhesive coating, hardening the layer of electron beam-hardenable adhesive simultaneously and together with the decorative layers comprising coating material, by exposing the adhesive and the coating material to electron radiation while maintaining a temperature and pressure for such period of time and thereby cross-linking and polymerizing until the decorative layer has reached a degree of hardness and producing a foil pack and rolling up the foil pack.

2. A process according to claim 1, wherein the foil pack produced is laminated on a carrier plate.

* * * * *